T. F. Longaker.
Stable Fork.
Nº 100778. Patented Mar. 15.1870.

Witnesses,
Edwin Shepard
Horace P. Wilbur

Inventor.
Thomas F. Longaker

United States Patent Office.

THOMAS F. LONGAKER, OF PHILADELPHIA, PENNSYLVANIA.

Letters Patent No. 100,778, dated March 15, 1870.

IMPROVEMENT IN MACHINE FOR CLEANING STABLES.

The Schedule referred to in these Letters Patent and making part of the same.

*To all whom it may concern:*

Be it known that I, THOMAS F. LONGAKER, of the city of Philadelphia, county of Philadelphia, in the State of Pennsylvania, have invented a new and improved Stable-Cleaner for Cleaning Stables; and I do hereby declare that the following is a full and exact description thereof, reference being had to the accompanying drawings and to the letters of reference marked thereon.

Figure 1:
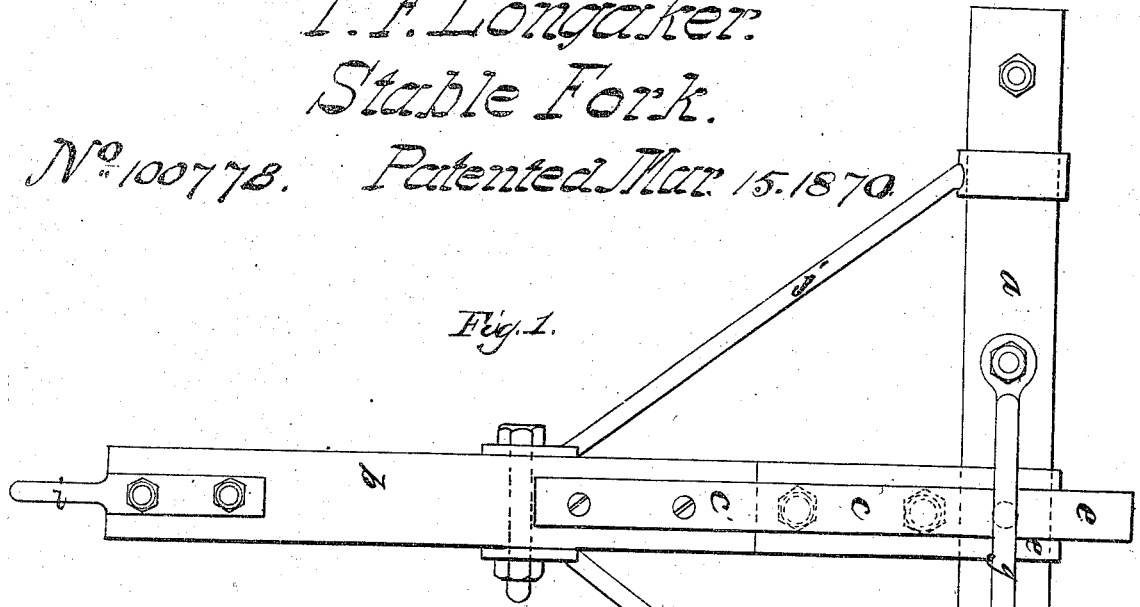
Figure 3:
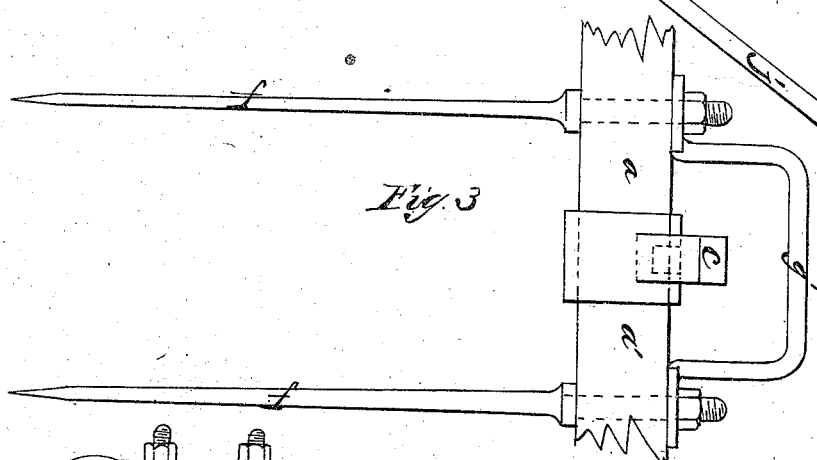
Figure 2:
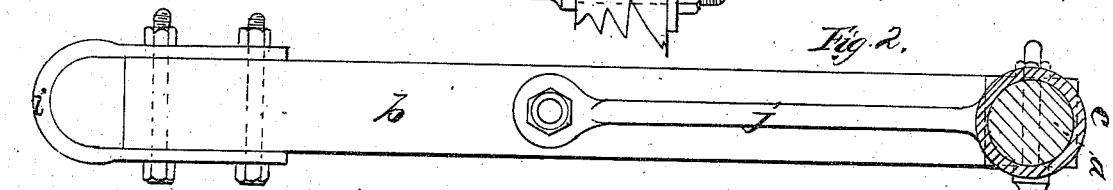
Figure 4:
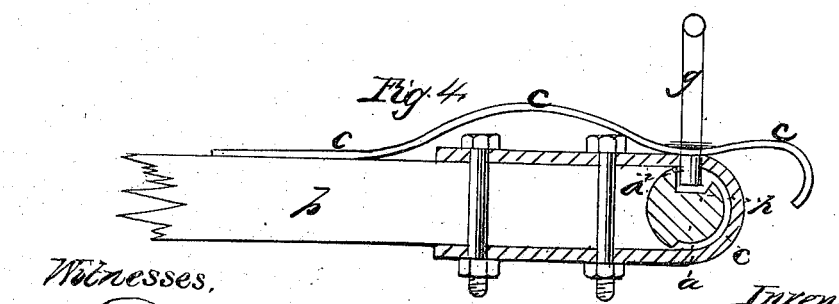

Figure 1 shows main perspective of the implement.
Figure 2 shows lateral view.
Figure 3 shows traverse section of cross-bar with teeth and handle.
Figure 4 shows section of tongue, with socket for revolving cross-bar, also spring, with nose or lug, fitting into orifice or aperture in socket.

The form and nature of my invention consists of a hook, scraper, or brush, made by fastening securely teeth, a scraper, or brush to a revolving head, $a$, attached to a tongue, $b$, or bar, to which power is intended to be applied $i$.

Fastened to the top of this tongue is a spring, $c$, with a nose, $d$, or lug attached, working into an orifice or aperture, $h$, in the revolving head or cross-bar $a$, said spring projecting beyond the said revolving head or cross-bar, forming a hold or catch for working the same.

Attached to the said head or cross-bar is a handle, $g$, for the convenience of setting and handling the implement.

What I claim as my invention, and desire to secure by Letters Patent, is—

A stable-cleaner, composed of a revolving head or cross-bar, $a\ a$, carrying the teeth $f\ f$, the socket $e$, the spring $c\ c$, with nose or lug $d$, fitting into aperture or orifice $h$, said spring fastened to top or bottom of tongue $b$, the diagonal supports $j\ j$, the tongue $b$, the teeth $f\ f$, all combined and arranged as herein set forth and described.

THOMAS F. LONGAKER.

Witnesses:
 HORACE P. WILBUR,
 WILLIAM H. WALTER.